United States Patent
Sun et al.

(10) Patent No.: US 11,286,057 B2
(45) Date of Patent: *Mar. 29, 2022

(54) GIMBAL, IMAGING DEVICE, AND UNMANNED AERIAL VEHICLE

(71) Applicant: SZ DJI OSMO TECHNOLOGY CO., LTD., Shenzhen (CN)

(72) Inventors: Rongjian Sun, Shenzhen (CN); Xifeng Zhao, Shenzhen (CN); Xin Yan, Shenzhen (CN); Tianhang Ma, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,803

(22) Filed: Aug. 3, 2020

(65) Prior Publication Data
US 2020/0361628 A1 Nov. 19, 2020

Related U.S. Application Data

(63) Continuation of application No. 16/202,875, filed on Nov. 28, 2018, now Pat. No. 10,745,149, which is a
(Continued)

(30) Foreign Application Priority Data
May 30, 2016 (CN) .......................... 201620506290.1

(51) Int. Cl.
*B64D 47/08* (2006.01)
*F16M 11/18* (2006.01)
(Continued)

(52) U.S. Cl.
CPC ............ *B64D 47/08* (2013.01); *B64C 39/024* (2013.01); *F16M 11/10* (2013.01);
(Continued)

(58) Field of Classification Search
None
See application file for complete search history.

(56) References Cited

U.S. PATENT DOCUMENTS

| 4,752,791 A | 6/1988 | Allred |
| 8,346,070 B2 | 1/2013 | Beasley |

(Continued)

FOREIGN PATENT DOCUMENTS

| CN | 203868619 U | 10/2014 |
| CN | 104696690 A | 6/2015 |

(Continued)

OTHER PUBLICATIONS

The World Intellectual Property Organization (WIPO) International Search Report and Written Opinion for PCT/CN2016/102552 dated Mar. 2, 2017 8 pages.

*Primary Examiner* — William B Perkey
(74) *Attorney, Agent, or Firm* — Anova Law Group, PLLC

(57) ABSTRACT

A gimbal for carrying a load includes a first frame configured to be coupled with the load, and a second frame rotatably coupled with the first frame. At least one of the first frame or the second frame includes a connecting segment and a movable segment movably coupled with the connecting segment. The movable segment is movable relative to the connecting segment to cause the at least one of the first frame or the second frame to extend or retract. The at least one of the first frame or the second frame includes a locking part disposed on one of the connecting segment and the movable segment. The locking part is configured to abut against the connecting segment or disengage from the connecting segment for placing the movable segment in a locked state or a movable state.

20 Claims, 12 Drawing Sheets

Related U.S. Application Data continuation of application No. PCT/CN2016/102552, filed on Oct. 19, 2016.

(51) Int. Cl.

| | |
|---|---|
| *F16M 11/20* | (2006.01) |
| *F16M 11/10* | (2006.01) |
| *B64C 39/02* | (2006.01) |
| *F16M 11/12* | (2006.01) |
| *G03B 15/00* | (2021.01) |
| *G03B 17/56* | (2021.01) |

(52) U.S. Cl.
CPC ............ *F16M 11/123* (2013.01); *F16M 11/18* (2013.01); *F16M 11/2071* (2013.01); *F16M 11/2092* (2013.01); *G03B 15/006* (2013.01); *G03B 17/561* (2013.01); *B64C 2201/127* (2013.01); *F16M 2200/022* (2013.01); *F16M 2200/041* (2013.01); *F16M 2200/044* (2013.01)

(56) References Cited

U.S. PATENT DOCUMENTS

| | | | | |
|---|---|---|---|---|
| 8,861,947 | B2* | 10/2014 | Webb | .................. H04N 5/2253 396/55 |
| 9,904,149 | B2 | 2/2018 | Casarez et al. | |
| 9,989,836 | B1* | 6/2018 | Riddel | ............... F16M 11/2085 |
| 10,073,326 | B2* | 9/2018 | Zhou | ...................... F16M 13/02 |
| 10,745,149 | B2* | 8/2020 | Sun | ....................... G03B 15/006 |
| 2009/0141143 | A1 | 6/2009 | Alm | |
| 2013/0193269 | A1 | 8/2013 | Zwaan et al. | |
| 2016/0173784 | A1 | 6/2016 | Lee | |
| 2017/0075351 | A1 | 3/2017 | Liu | |
| 2017/0131622 | A1* | 5/2017 | Zhao | .................... G03B 17/561 |
| 2019/0161208 | A1 | 5/2019 | Sun et al. | |
| 2019/0202549 | A1 | 7/2019 | Zhang et al. | |

FOREIGN PATENT DOCUMENTS

| | | |
|---|---|---|
| CN | 204372480 U | 6/2015 |
| CN | 204852847 U | 12/2015 |
| CN | 105270646 A | 1/2016 |
| CN | 204937522 U | 1/2016 |
| CN | 204956946 U | 1/2016 |
| CN | 105329455 A | 2/2016 |
| CN | 205045003 U | 2/2016 |
| CN | 205203412 U | 5/2016 |
| CN | 205678382 U | 11/2016 |
| DE | 202015104758 U1 | 12/2015 |

\* cited by examiner

GIMBAL, IMAGING DEVICE, AND UNMANNED AERIAL VEHICLE

CROSS-REFERENCE TO RELATED APPLICATIONS

This application is a continuation of application Ser. No. 16/202,875, filed on Nov. 28, 2018, which is a continuation of International Application No. PCT/CN2016/102552, filed on Oct. 19, 2016, which claims priority to Chinese Patent Application No. 201620506290.1, filed on May 30, 2016, the entire contents of all of which are incorporated herein by reference.

TECHNICAL FIELD

The present disclosure relates to the technology field of imaging and, more particularly, to a gimbal, an imaging device, and an unmanned aerial vehicle.

BACKGROUND

In current technologies, when a gimbal carries different loads, the center of gravity of the gimbal may change, causing a rotation shaft of the gimbal to experience unexpected torque, which causes extra wear and loss to a motor connected with the shaft that rotates to drive the shaft. Moreover, as a result, the lifetime of the rotation shaft of the gimbal and the precision of gimbal control are affected.

SUMMARY

In accordance with the present disclosure, there is provided a gimbal for carrying a load includes a first frame configured to be coupled with the load. The gimbal also includes a second frame rotatably coupled with the first frame. At least one of the first frame or the second frame comprises a connecting segment and a movable segment movably coupled with the connecting segment, the movable segment being movable relative to the connecting segment to cause the at least one of the first frame or the second frame to extend or retract, and the at least one of the first frame or the second frame comprises a locking part, the locking part being disposed on one of the connecting segment and the movable segment and being configured to abut against the connecting segment or disengage from the connecting segment for placing the movable segment in a locked state or a movable state.

In accordance with the present disclosure, there is also provided an imaging device. The imaging device includes an image capturing sensor configured to capture one or more images. The imaging device also includes a gimbal for carrying the image capturing sensor. The gimbal includes a first frame configured to be coupled with the image capturing sensor. The gimbal also includes a second frame rotatably coupled with the first frame. At least one of the first frame or the second frame comprises a connecting segment and a movable segment movably coupled with the connecting segment, the movable segment being movable relative to the connecting segment to cause the at least one of the first frame or the second frame to extend or retract, and the at least one of the first frame or the second frame comprises a locking part, the locking part being disposed on one of the connecting segment and the movable segment and being configured to abut against the connecting segment or disengage from the connecting segment for placing the movable segment in a locked state or a movable state.

In accordance with the present disclosure, there is further provided an unmanned aerial vehicle. The unmanned aerial vehicle includes a body and an imaging device mounted to the body. The imaging device includes an image capturing sensor configured to capture one or more images. The imaging device also includes a gimbal for carrying the image capturing sensor. The gimbal includes a first frame configured to be coupled with the image capturing sensor. The gimbal also includes a second frame rotatably coupled with the first frame. At least one of the first frame or the second frame comprises a connecting segment and a movable segment movably coupled with the connecting segment, the movable segment being movable relative to the connecting segment to cause the at least one of the first frame or the second frame to extend or retract, and the at least one of the first frame or the second frame comprises a locking part, the locking part being disposed on one of the connecting segment and the movable segment and being configured to abut against the connecting segment or disengage from the connecting segment for placing the movable segment in a locked state or a movable state.

In accordance with the present disclosure, there is further provided a gimbal for carrying a load includes a first frame configured to be coupled with the load. The gimbal also includes a second frame rotatably coupled with the first frame. The first frame comprises a first connecting segment and a first movable segment movably coupled with the first connecting segment, the first movable segment being movable relative to the first connecting segment to cause the first frame to extend or retract along a first axis of the gimbal to change a shape of the first frame. The second frame comprises a second connecting segment and a second movable segment movably coupled with the second connecting segment, the second movable segment being movable relative to the second connecting segment to cause the second frame to extend or retract along a second axis of the gimbal to change a shape of the second frame. The at least one of the first frame or the second frame comprises a locking part, the locking part being disposed on one of the first connecting segment and the first movable segment and being configured to abut against the first connecting segment or disengage from the first connecting segment, or the locking part being disposed on one of the second connecting segment and the second movable segment and being configured to abut against the second connecting segment or disengage from the second connecting segment.

The present disclosure provides a gimbal, an imaging device, and an unmanned aerial vehicle ("UAV"). A frame can extend and retract to adjust the position of the load relative to the gimbal, thereby adjusting the overall center of gravity of the load and the gimbal. As a result, unexpected torque that might otherwise be experienced by various rotation shafts or axes of the gimbal may be reduced or avoided. Moreover, the control precision of the gimbal is enhanced.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

LIST OF ELEMENTS

Figure 1:
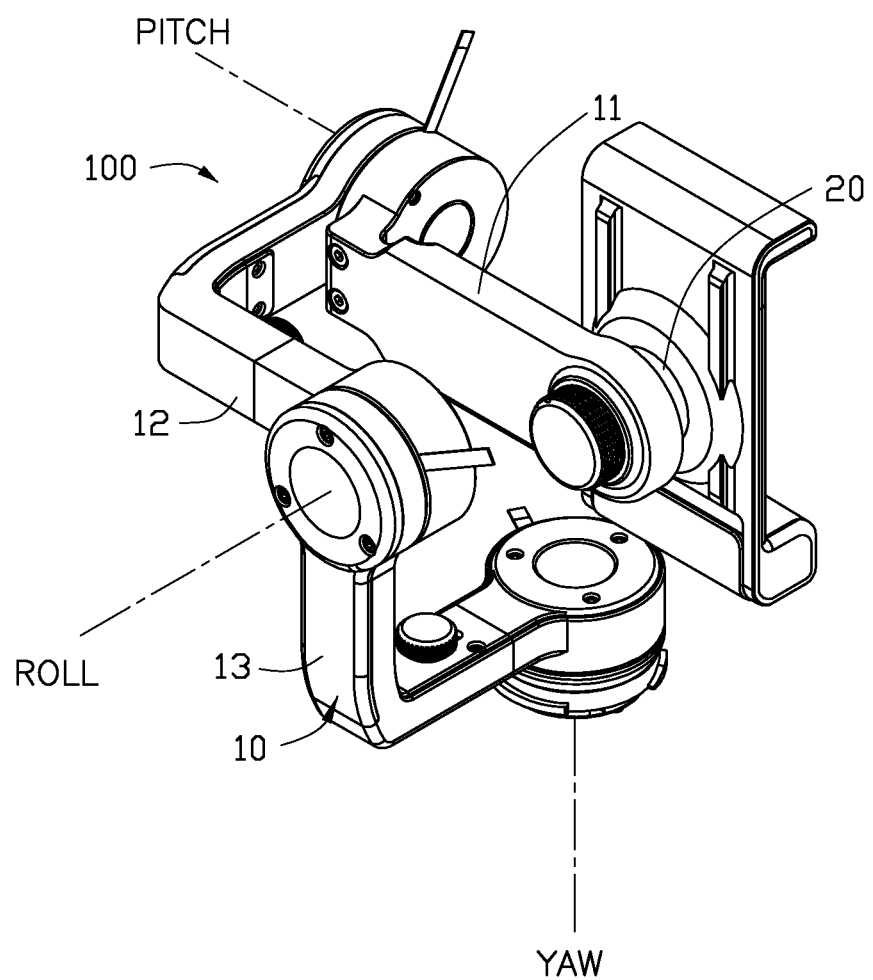
FIG. 1 is a perspective view of a gimbal according to an example embodiment.

| Element | Number |
|---|---|
| Gimbal | 100 |
| Frame | 1, 2 |
| Frame assembly | 10 |
| Movable segment | 101, 105 |
| Connecting segment | 102, 106 |
| Mounting segment | 107 |
| Locking part | 103 |
| Mounting base | 104 |
| First frame | 11 |
| Second frame | 12 |
| Third frame | 13 |
| Holder | 20 |
| Load | 200 |
| Transmission mechanism | 30, 40, 50, 60 |
| Nut | 31 |
| Lead screw | 32 |
| Gear | 41 |
| Teeth strap | 42 |
| Cam | 51 |
| Follower | 52 |
| Fixing part | 61 |
| Moving part | 62 |
| First driving device | 111 |
| Second driving device | 121 |
| Third driving device | 131 |

The embodiments of the present disclosure will be explained below with reference to the accompanying drawings.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Example embodiments will be described with reference to the accompanying drawings, in which the same numbers refer to the same or similar elements unless otherwise specified.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed. The term "communicatively coupled" indicates that related items are coupled or connected through a communication chancel, such as a wired or wireless communication channel.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

FIG. 1 shows a perspective view of a gimbal 100 according to an example embodiment of the present disclosure. The gimbal 100 may carry a load 200 (not shown in FIG. 1; shown in FIGS. 4 and 5). In some embodiments, the gimbal 100 may carry the load 200 in a carrier device (not shown) to allow the load 200 to perform various operations. In some embodiments, the load 200 may include at least one of an imaging device, a thermal source detecting device, a life detecting device, etc. In some embodiments, the carrier device may provide an operation environment for the load 200. In some embodiments, the carrier device may be a UAV or an unmanned ground vehicle, such as a car or other devices mounted in the car, etc. In some embodiments, the load 200 may include an imaging device, such as a camera, a camcorder, a smart phone, etc. In some embodiments, the load 200 may include other devices, such as an ultrasonic imaging device, an infrared imaging device, etc. In some embodiments, the carrier device may carry the load 200 through the gimbal 100 to perform imaging operations.

The gimbal 100 may adjust the position and/or orientation of the load 200. In some embodiments, the gimbal 100 may compensate for the vibration experienced by the load 200 through rotation operations, thereby stabilizing the load 200. In some embodiments, the gimbal 100 may include a frame assembly 10 and a holder 20 coupled with the frame assembly 10. The gimbal 100 may be coupled with the carrier device, such as a body of a UAV, a device mounted in a vehicle, etc., through the frame assembly 10. The holder 20 may hold or support the load 200.

In some embodiments, the frame assembly 10 may adjust a position of the load 200 relative to the gimbal 100 by changing the shape of the frame assembly, thereby adjusting an overall center of gravity of the gimbal 100 and the load 200. As a result, unexpected torque that might otherwise be experienced by various rotation shafts or axes of the gimbal 100 may be reduced or avoided. In some embodiments, the unexpected torque may include the torque experienced by the shafts or axes of the gimbal 100 caused by the deviation of the center of gravity of the gimbal 100 and the load 200.

In some embodiments, the frame assembly 10 may include one or multiple frames. For example, the frame assembly 10 may include at least one of a first frame 11, a second frame 12, or a third frame 13. The third frame 13 may be rotatably coupled with the carrier device (e.g., the UAV). That is, the gimbal 100 may be rotatably coupled with the carrier device through the third frame 13. The second frame 12 may be coupled with the third frame 13. In some embodiments, the second frame 12 may be rotatable relative to the third frame 13. The first frame 11 may be coupled with the second frame 12. In some embodiments, the first frame 11 may be rotatable relative to the second frame 12. The holder 20 may be coupled with the first frame 11. In some embodiments, the frame assembly 10 may include one, two, four, or more frames.

At least one frame of the multiple frames included in the frame assembly 10 may include a movable segment, a connecting segment, and a locking part. The movable segment may be movably coupled with the connecting segment. In some embodiments, the movable segment may be slidable relative to the connecting segment, causing the structure of the frame to extend or retract to change its shape. The locking part may be disposed on the movable segment. In some embodiments, the locking part may be configured to fix a relative position between the movable segment and the connecting segment. In some embodiments, the locking part may be disposed on the connecting part.

Figure 2:
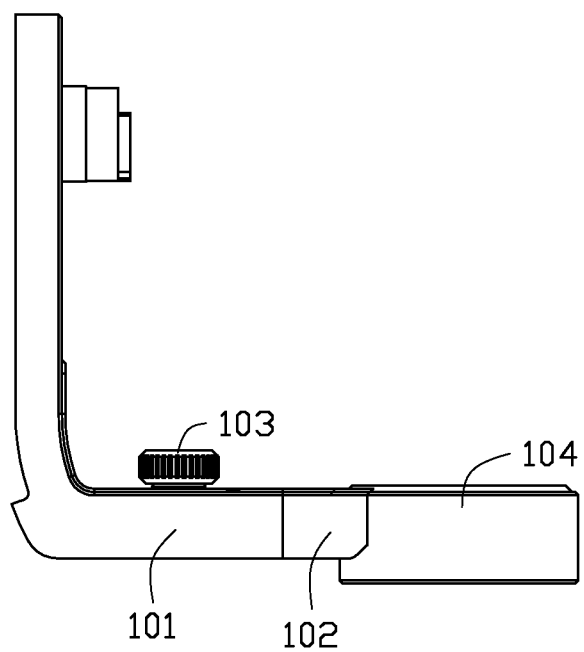
FIG. 2 is a schematic illustration of the structure of a frame shown in FIG. 1 when the frame is in a retracted state, according to an example embodiment.
Figure 3:
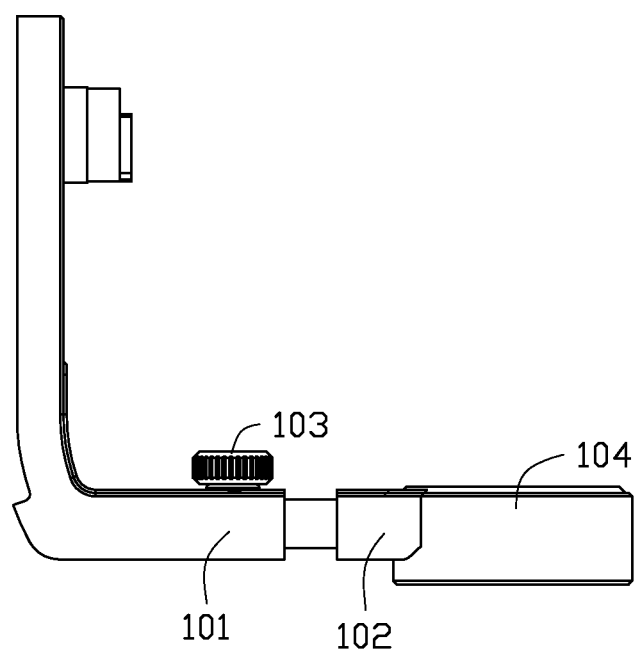
FIG. 3 is a schematic illustration of the structure of a frame shown in FIG. 1 when the frame is in an extended state, according to an example embodiment.

The third frame 13 will be described with reference to FIGS. 2 and 3. In the embodiments shown in FIGS. 2 and 3, the third frame 13 may include a movable segment 101, a connecting segment 102 movably coupled with the movable segment 101, and a locking part 103 coupled with the movable segment 101. In some embodiments, the connecting segment may be coupled with the carrier device (e.g., UAV). In some embodiments, the movable segment 101 may be sleeve coupled with the connecting segment 102. The movable segment 101 may be movable relative to and along the connecting segment 102 to cause the third frame 13 to extend or retract to change its shape. In some embodiments, the movable segment 101 may substantially have an L shape. In some embodiments, the second frame 12 may be coupled with the movable segment 101 of the third frame 13.

In some embodiments, the movable segment 101 may be sleeve coupled with the connecting segment 102, and may be slidable along and relative to the connecting segment 102. In some embodiments, an end of the movable segment 101 includes a receiving chamber. An end of the connecting segment 102 may be sleeve mounted within the receiving chamber.

In some embodiments, the locking part 103 may be a rotatable knob or a press locking mechanism. For example, in some embodiments, the locking part 103 may be rotatable to abut against the connecting segment 102 or to disengage from the connecting segment 102, thereby placing the movable segment 101 in a locked state or a movable state (e.g., an unlocked state). In some embodiments, an outer surface of an end of the locking part 103 may include external threads. Correspondingly, the movable segment 101 may include a threaded hole connected with the receiving chamber. In some embodiments, the external threads and the threaded hole may match together, such that the locking part 103 and the movable segment 101 are coupled with one another through threads. Through rotation, the end of the locking part 103 having the external threads may abut against the connecting segment 102 or may disengage from the connecting segment 102. In some embodiments, the locking part 103 may abut against or disengage from the connecting segment 102 through other manners, such as through a press locking mechanism.

In some embodiments, the movable segment 101 and the connecting segment 102 may have an alternative sleeve coupling relationship. For example, an end of the connecting segment 102 may include a receiving chamber. An end of the movable segment 101 may be sleeve coupled with the connecting segment 102 within the receiving chamber. In some embodiments, the locking part 103 may be coupled with the connecting segment 102.

In some embodiments, when the movable segment 101 is in a locked state, the end of the locking part 103 may abut against the connecting segment 102. An outer surface of a portion of the connecting segment 102 that is inserted into the movable segment 101 may tightly abut against an inner wall of the movable segment 101, restraining the movable segment 101 and the connecting segment 102 from moving relative to one another. In some embodiments, when the movable segment 101 is in the movable state (e.g., unlocked state), the movable segment may be slidable along the connecting segment 102. As a result, a distance between an end of the movable segment 101 distant from the connecting segment 102 and the connecting segment 102 may be changed. The change of the distance may cause the third frame 13 to extend or retract to change its shape. In some embodiments, an end of the connecting segment 102 distant from the movable segment 101 may be coupled with a mounting base 104. The mounting base 104 may be coupled with a driving device. The driving device may drive the third frame 13 to rotate relative to the load 200.

In some embodiments, each of the second frame 12 and the third frame 13 may include the above-described movable segment 101, the connecting segment 102, and the locking part 103. In some embodiments, the first frame 11 may also include similar structures. When the first frame 11, the second frame 12, and the third frame 13 include the movable segment 103 and the connecting segment 102, the connecting segment (not shown) of the second frame 12 may be coupled with the movable segment 101 of the third frame 13, and the connecting segment (not shown) of the first frame 11 may be coupled with the movable segment (not shown) of the second frame 12. In some embodiments, the holder 20 may be coupled with the movable segment (not shown) of the first frame 11.

In some embodiments, a direction of sliding of the movable segment 101 of the third frame 13 relative to the connecting segment 102 of the third frame 13 may be substantially perpendicular to a yaw axis of the gimbal 100. In addition, the direction of sliding of the movable segment 101 of the third frame 13 relative to the connecting segment 102 of the third frame 13 may be substantially parallel to a roll axis of the gimbal 100. A user may adjust the connecting segment 102 and the movable segment 101 of the third frame 13 to cause the third frame 13 to extend or retract along the roll axis to change its shape. In some embodiments, a direction of sliding of the movable segment of the second frame 12 relative to the connecting segment of the second frame 12 may be substantially perpendicular to the roll axis of the gimbal 100. In addition, the direction of sliding of the movable segment of the second frame 12 relative to the connecting segment of the second frame 12 may be substantially parallel to a pitch axis of the gimbal 100. A user may adjust the connecting segment and the movable segment of the second frame 12 to cause the second frame 12 to extend or retract along the pitch axis to change its shape. In some embodiments, a direction of sliding of the movable segment of the first frame 11 relative to the connecting segment of the first frame 11 may be substantially perpendicular to the roll axis of the gimbal 100. In addition, the direction of sliding of the movable segment of the first frame 11 relative to the connecting segment of the first frame 11 may be substantially parallel to the pitch axis of the gimbal 100. A user may adjust the connecting segment and the movable segment of the first frame 11 to cause the first frame 11 to extend or retract along the pitch axis to change its shape. Through the connecting segments and the movable segments of the frames, a user may adjust the relative position between a connecting segment and a movable segment to cause a frame to extend or retract to change its shape, thereby adjusting the center of gravity of the gimbal 100 and the load 200 to locate on a rotation axis of the gimbal 100.

In some embodiments, the direction of sliding of the movable segment of the first frame 11 relative to the connecting segment of the first frame 11 may be substantially perpendicular to the pitch axis of the gimbal 100. In addition, the direction of sliding of the movable segment of the first frame 11 relative to the connecting segment of the first frame 11 may be substantially parallel to the yaw axis of the gimbal 100. A user may adjust the mounting position of the load 200 in a three-dimensional coordinate system by adjusting the first frame 11, the second frame 12, and the third frame 13, thereby adjusting the center of gravity of the gimbal 100 and the load 200 to locate on a rotation axis of the gimbal 100.

In some embodiments, the gimbal 100 may include at least one of a first driving device 111, a second driving device 121, and a third driving device 131. The first driving device 111 may be disposed on the second frame 12 and configured to drive the first frame 11 to rotate relative to the second frame 12. The second driving device 121 may be disposed on the third frame 13 and configured to drive the second frame 12 to rotate relative to the third frame 13. An end of the third driving device 131 may be coupled with the third frame 13, and another end of the third driving device 131 may be coupled with the carrier device (e.g., UAV). The third driving device 131 may be configured to drive the third frame 13 to rotate relative to the carrier device.

In some embodiments, the gimbal 100 may include a controller (not shown). The controller may include a processor configured or programmed to control at least one of the first driving device 111, the second driving device 121, or the third driving device 131, so as to control the rotation of at least one of the first frame 11, the second frame 12, or the third frame 13, thereby adjusting the position and/or the orientation of the load 200 to stabilize the load 200.

In some embodiments, a number of the driving devices may be set based on a number of the frames of the gimbal 100. For example, the gimbal 100 may include only the first driving device 111, or any two of the first driving device 111, the second driving device 121, and the third driving device 131.

Figure 4:
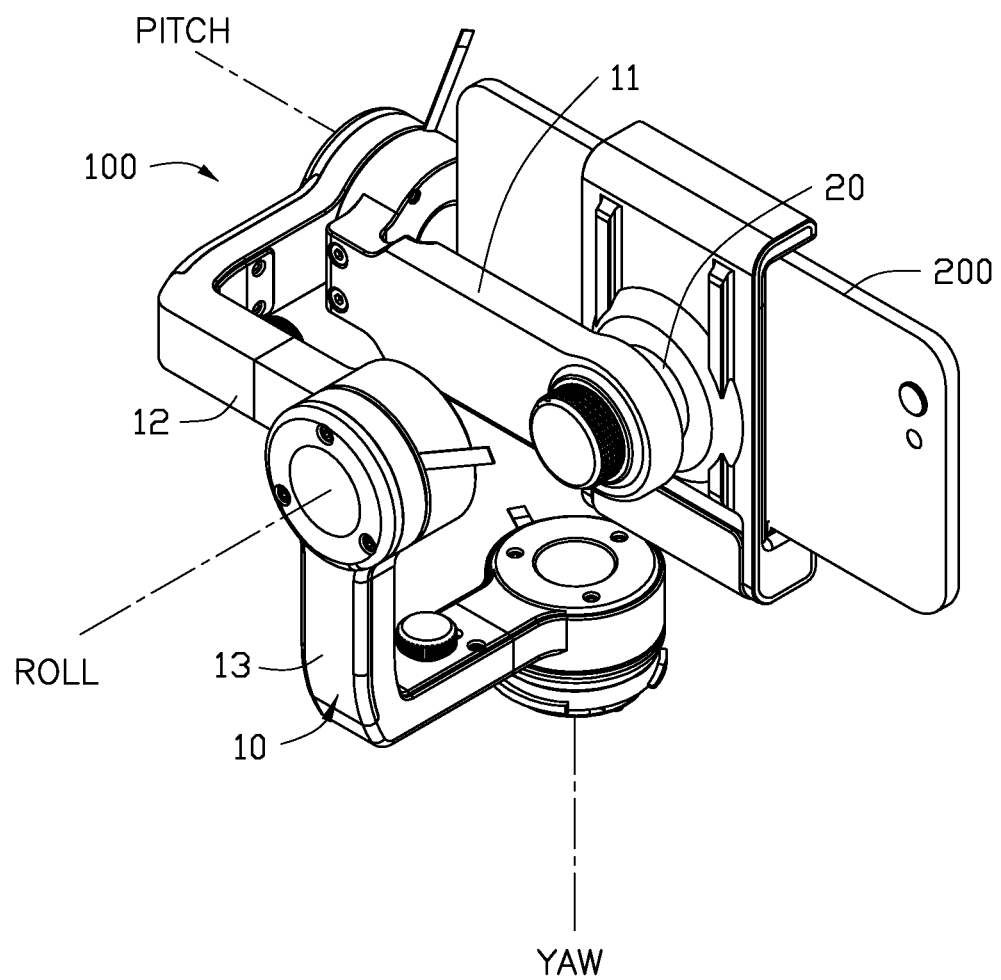
FIG. 4 is a perspective view of the gimbal when the gimbal is in an operation state according to an example embodiment.
Figure 5:
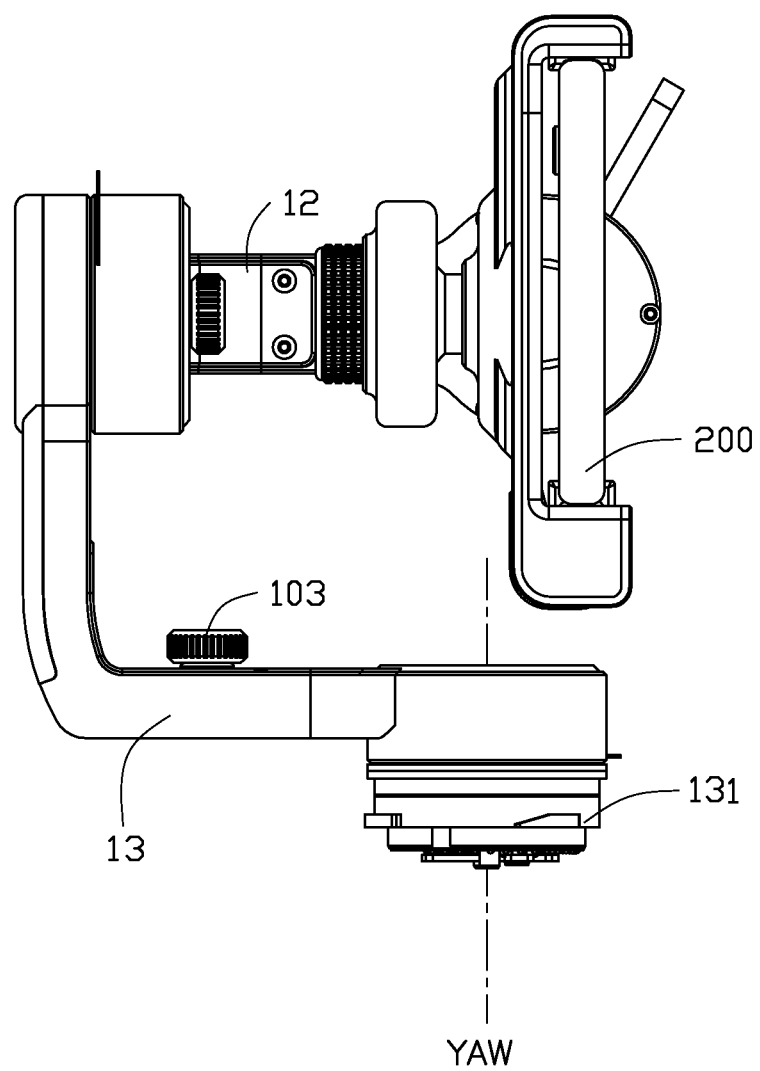
FIG. 5 is a side view of the gimbal shown in FIG. 4 when the gimbal is in an operation state according to an example embodiment.
Figure 6:
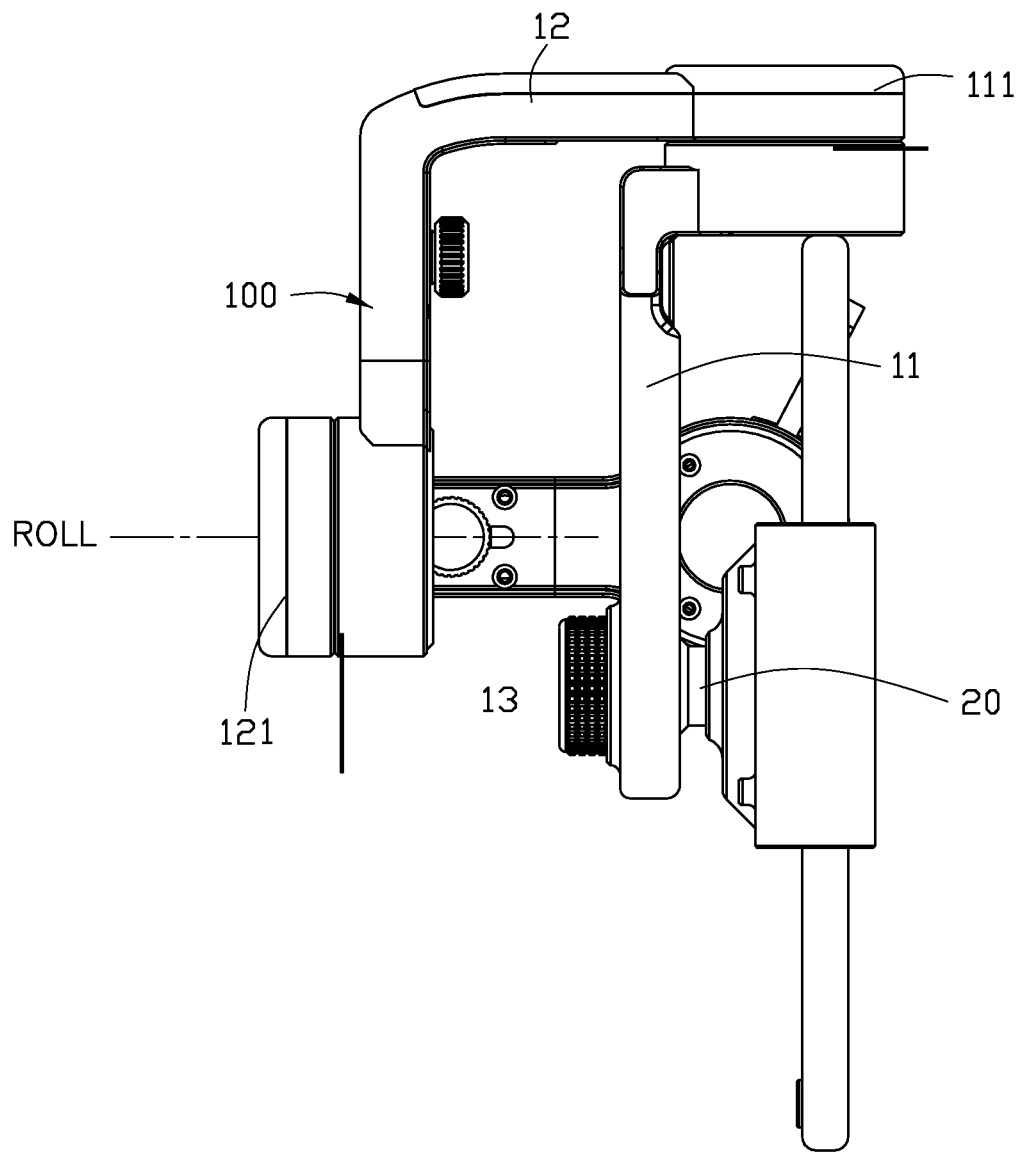
FIG. 6 is another side view of the gimbal shown in FIG. 4 when the gimbal is in an operation state according to an example embodiment.

Referring to FIGS. 4-6, after the load 200 is mounted on the gimbal 100, when a center of gravity of the gimbal 100 and the load 200 departs or deviates from the yaw axis of the gimbal 100, a user or a controller of the gimbal 100 may adjust the center of gravity of the gimbal 100 and the load 200 to locate on the yaw axis by performing at least one of the following: adjusting a connecting position of the movable segment of the third frame 13 relative to the connecting segment of the third frame 13, adjusting a connecting position of the movable segment of the second frame 12 relative to the connecting segment of the second frame 12, or adjusting a connecting position of the movable segment of the first frame 11 relative to the connecting segment of the first frame 11.

In some embodiments, after the load 200 is mounted to the gimbal 100, when the center of gravity of the gimbal 100 and the load 200 departs or deviates from the roll axis of the gimbal 100, a user or a controller of the gimbal 100 may adjust the center of gravity of the gimbal 100 and the load 200 to locate on the roll axis by performing at least one of the following: adjusting a connecting location of the movable segment of the second frame 12 relative to the connecting segment of the second frame 12, or adjusting a connecting position of the movable segment of the first frame 11 relative to the connecting segment of the first frame 11.

In some embodiments, when the load 200 includes an image capturing sensor, the gimbal 100 and the load 200 may form an imaging device. For example, the load 200 may include a camera, a camcorder, a smart phone, an ultrasonic imaging device, an infrared imaging device, etc. The imaging device may be used on unmanned vehicles. The unmanned vehicles may include unmanned aircrafts, unmanned ground vehicles, or unmanned water surface vehicles or under water vehicles, etc.

Figure 7:
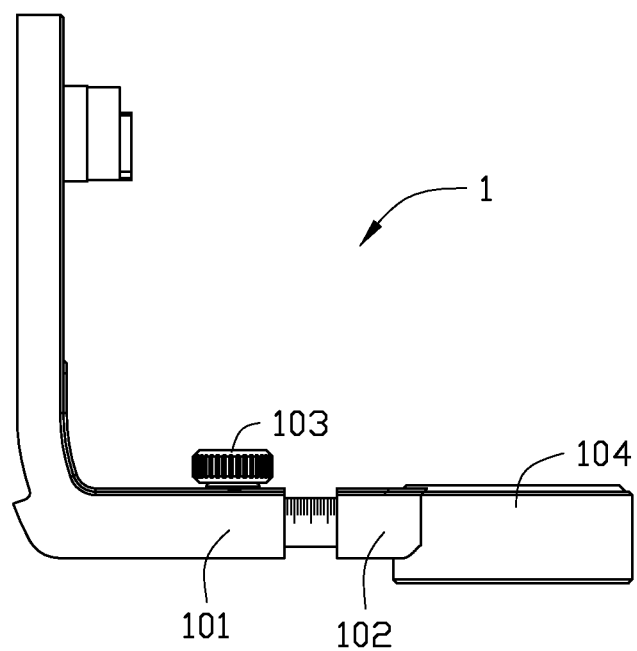
FIG. 7 is a schematic illustration of the structure of a frame of the gimbal according to another example embodiment.

FIG. 7 is a side view of a frame 1 of a plurality of frames included in a frame assembly of a gimbal according to an example embodiment of the present disclosure. The frame 1 may include structures similar to those of the second frame 12 and/or the third frame 13 described above. An end of the connecting segment 102 of the frame 1 sleeve coupled with the receiving chamber may include a scale. When the gimbal carries the load and when the shafts/axes of the gimbal do not experience unexpected torques after the above-described adjustments are made, a user may record the value or location of the scale that indicates the position of the movable segment 101 relative to the connecting segment 102. When the gimbal carries the same or similar load the next time, the user may quickly adjust the movable segment 101 based on the recorded value or location of the scale, such that the shafts and/or axes of the gimbal do not experience unexpected torques. In some embodiments, the user may record the values or locations of the scale indicating the position of the movable segment 101 relative to the connecting segment 102 when loads of different weights are mounted to the gimbal and when the shafts and/or axes of the gimbal do not experience unexpected torques after the above-described adjustments are made. As a result, the configurations of the gimbal may be quickly switched (through adjusting the frames) to couple with different loads.

Figure 8:
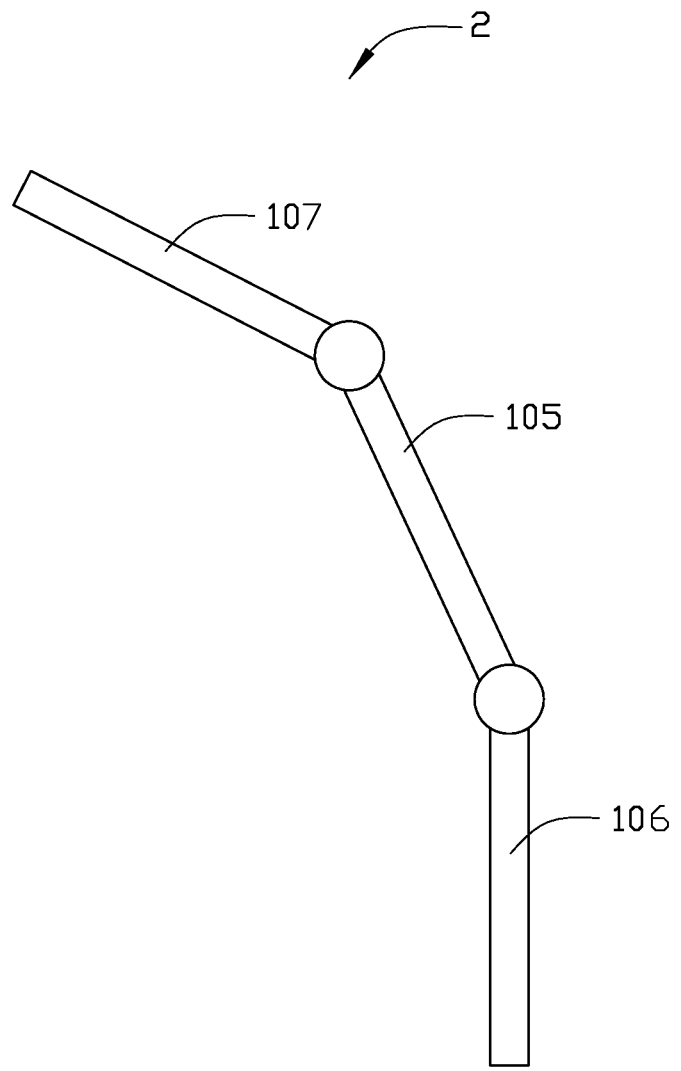
FIG. 8 is a schematic illustration of the structure of a frame of the gimbal according to another example embodiment.

FIG. 8 shows a frame 2 of a plurality of frames included in a frame assembly of a gimbal according to an example embodiment. Similar to the frame assembly 10, the frame assembly of this embodiment may also include multiple frames. The connections between the multiple frames may be similar to those included in the frame assembly 10. Similar to the frames included in the frame assembly 10, the frame 2 may include a connecting segment 106 and a movable segment 105 movably coupled with the connecting segment 106. In some embodiments, the frame 2 may include a linkage structure. The frame 2 may include the connecting segment 106, the movable segment 105, and a mounting segment 107. The connecting segment 106, the movable segment 105, and the mounting segment 107 may be rotatably coupled with one another as shown in FIG. 8. By adjusting angles at the joints connecting the connecting segment 106, the movable segment 105, and the mounting segment 107, the frame 2 may be caused to extend or retract to change its shape, thereby adjusting the position of the load 200 relative to the gimbal. Through adjustments, the center of gravity of the gimbal and the load 200 may be located on a rotation axis. In some embodiments, the frame 2 may include only the connecting segment and the movable segment rotatably coupled with the connecting segment.

Figure 9:
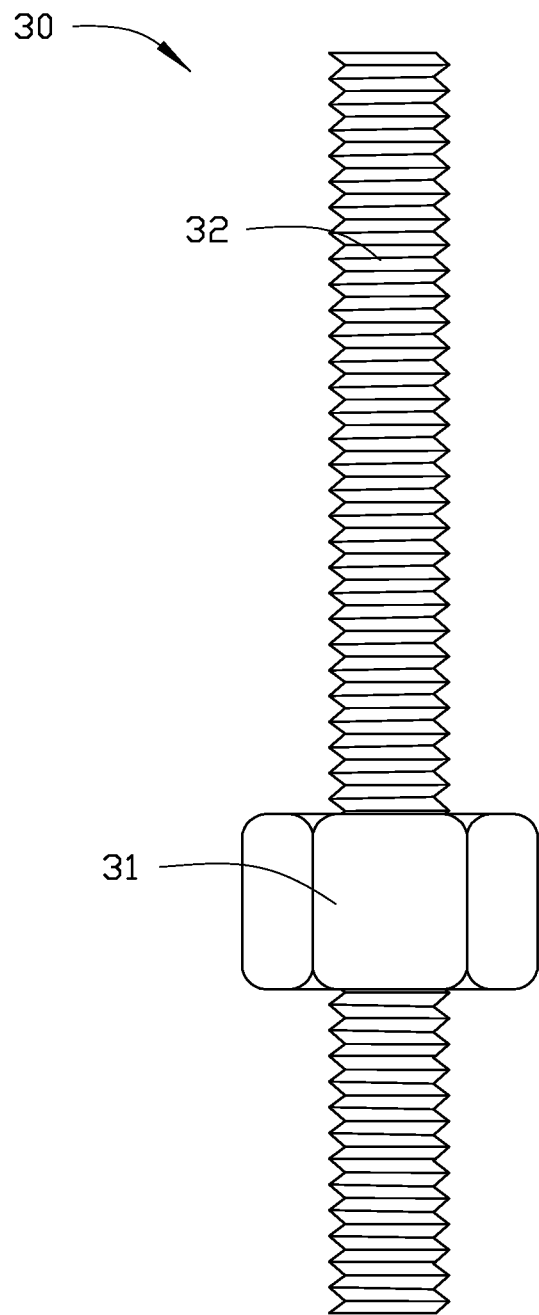
FIG. 9 is a schematic illustration of a structure for providing extension and retraction of the gimbal according to an example embodiment.

FIG. 9 shows a transmission mechanism 30 through which a relative position between the movable segment and the connecting segment of a frame of the gimbal may be adjusted. The transmission mechanism 30 may be implemented in any of the embodiments of the gimbal disclosed herein. In some embodiments, the transmission mechanism 30 includes a lead screw and nut structure. For example, the transmission mechanism 30 may include a nut 31 and a lead screw 32 coupled with the nut 31 through threads. The lead screw 32 may be rotatably disposed on a connecting segment of a frame, and the nut 31 may be fixedly connected with the movable segment of the frame. The lead screw 32 may rotate to cause the nut 31 to move along the lead screw 32. Movement of the nut 31 may cause the movable segment of the frame to move relative to the connecting segment of the frame. In some embodiments, the lead screw 32 may be disposed on the movable segment of the frame, and the nut 31 may be disposed on the connecting segment of the frame.

Figure 10:
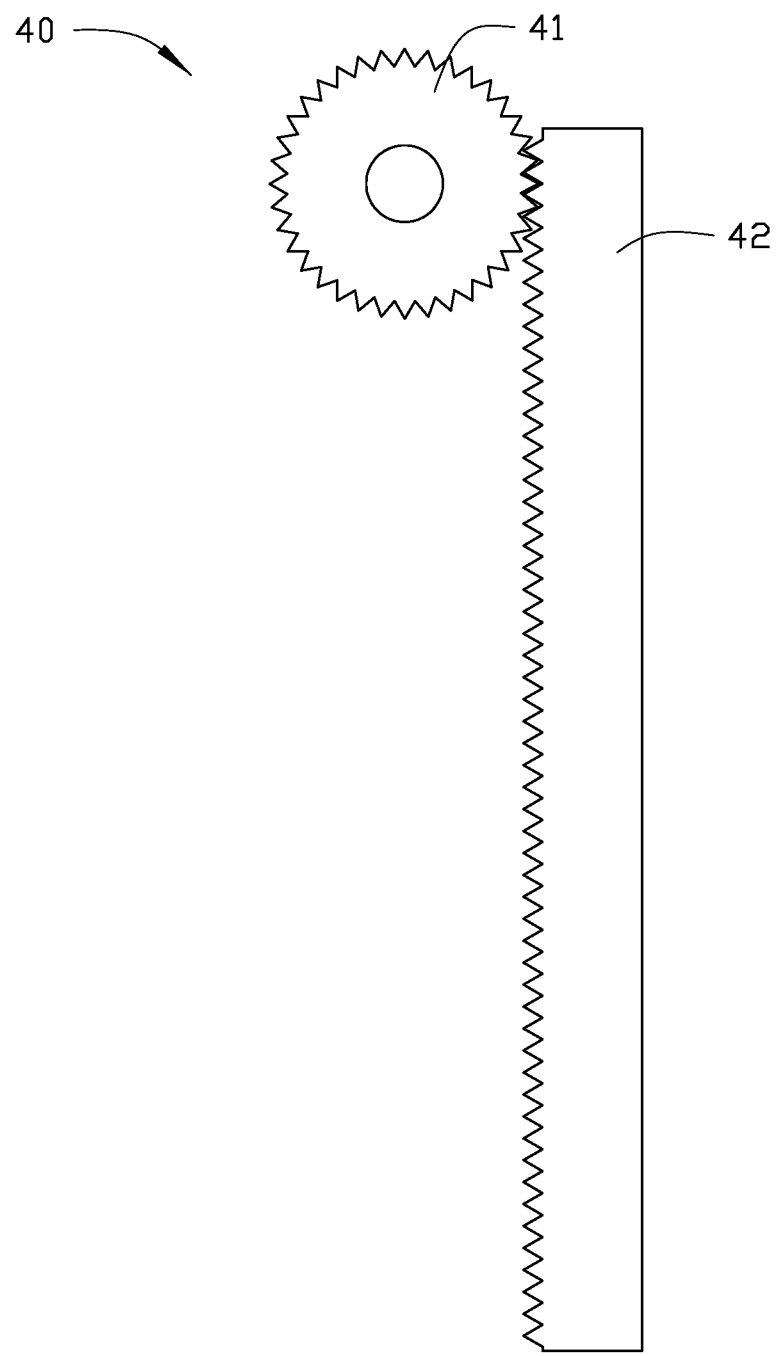
FIG. 10 is a schematic illustration of a structure for providing extension and retraction of the gimbal according to another example embodiment.

FIG. 10 shows another transmission mechanism 40 through which a relative position between the movable segment and the connecting segment of a frame of the gimbal may be adjusted. The transmission mechanism 40 may include a gear 41 and a teeth strap 42 meshed with the gear 41. In some embodiments, the gear 41 may be disposed on the connecting segment of the frame, and the teeth strap 42 may be connected with the movable segment of the frame. The gear 41 may rotate to cause the teeth strap 42 to move (e.g., to translate). The translation or movement of the teeth strap 42 may cause the movable segment of the frame to move relative to the connecting segment of the frame.

Figure 11:
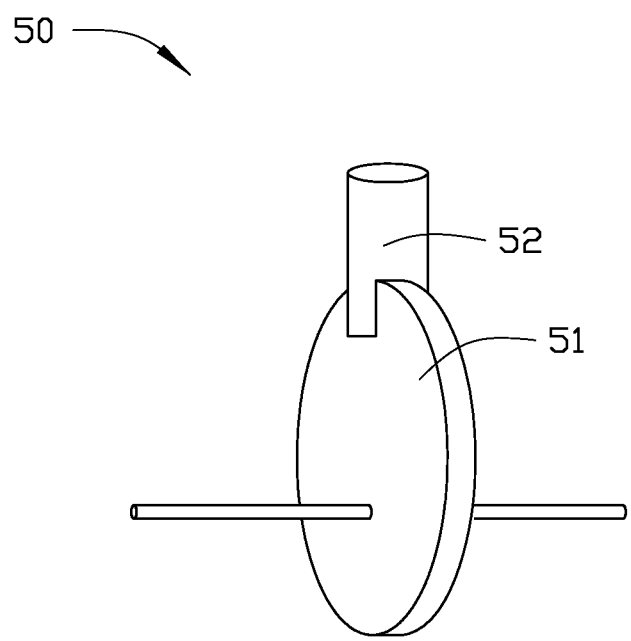
FIG. 11 is a perspective view of a structure for providing extension and retraction of the gimbal according to another example embodiment.

FIG. 11 shows another transmission mechanism 50 through which a relative position between the movable segment and the connecting segment of a frame of the gimbal may be adjusted. The transmission mechanism 50 may include a cam 51 and a follower 52 movably coupled with the cam 51. The cam 51 may rotate to cause the follower 52 to move relative to the rotation axis of the cam 51. In some embodiments, the cam 51 may be disposed on the connecting segment of the frame, and the follower 52 may be connected with the movable segment of the frame. The cam 51 may rotate to cause the follower 52 to move. The movement of the follower 52 may cause the movable segment of the frame to move simultaneously or synchronously relative to the connecting segment.

Figure 12:
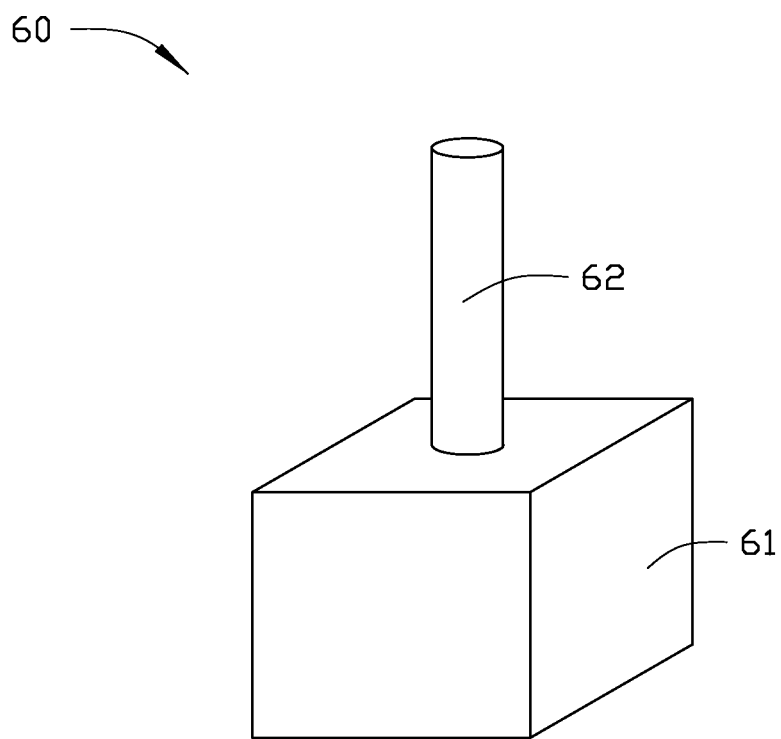
FIG. 12 is a perspective view of a structure for providing extension and retraction of the gimbal according to another example embodiment.

FIG. 12 is a perspective view of a transmission mechanism 60 through which the relative position between the movable segment and the connecting segment of a frame of the gimbal may be adjusted. The transmission mechanism 60 may include a fixing part 61 and a movable part 62 movably coupled with the fixing part 61. In some embodiments, the movable part 62 may translate in a straight line along the fixing part 61. The fixing part 61 may be coupled with the connecting segment of the frame, and the movable part 62 may be coupled with the movable segment of the frame. The movable part 62 may cause the movable segment of the frame to move simultaneously or synchronously relative to the connecting segment. In some embodiments, the transmission mechanism 60 may include a linear motor.

In the disclosed gimbal, imaging device, and unmanned aerial vehicle, the frame can extend or retract to change its shape. Through the extension or retraction, the position of the load relative to the gimbal may be adjusted, thereby adjusting the center of gravity of the gimbal and the load, reducing or avoiding unexpected torques that might otherwise be experienced by the various shafts or axes of the gimbal. As a result, the control precision of the gimbal is enhanced.

A person having ordinary skill in the art can appreciate that the above embodiments are only examples of the present disclosure, and do not limit the scope of the present disclosure. Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A gimbal for carrying a load, comprising:
a first frame configured to be coupled with the load; and
a second frame rotatably coupled with the first frame,
wherein:
at least one of the first frame or the second frame comprises a connecting segment and a movable segment movably coupled with the connecting segment, the movable segment being movable relative to the connecting segment to cause the at least one of the first frame or the second frame to extend or retract, and
the connecting segment and the movable segment are sleeve coupled, and the movable segment includes a receiving chamber, and an end of the connecting segment sleeve coupled with the receiving chamber includes a scale to allow a user to record a value of the scale when the gimbal does not experience unexpected torques, the value of the scale indicating a position of the movable segment relative to the connecting segment corresponding to a weight of the load.

2. The gimbal of claim 1, wherein:
the movable segment is movable relative to the connecting segment to cause the at least one of the first frame or the second frame to extend or retract, the extension or retraction causes an adjustment of a position of the load relative to the gimbal, which in turn causes an adjustment of a center of gravity of the gimbal and the load.

3. The gimbal of claim 1, wherein:
the at least one of the first frame or the second frame comprises a locking part, the locking part being disposed on one of the connecting segment and the movable segment and being configured to abut against the connecting segment or disengage from the connecting segment for placing the movable segment in a locked state or a movable state; and
the locking part includes:
a rotatable knob; or
a press locking mechanism.

4. The gimbal of claim 1, further comprising:
a transmission mechanism configured to couple the movable segment and the connecting segment, wherein the movable segment is movable relative to the connecting segment through the transmission mechanism.

5. The gimbal of claim 4, wherein:
the transmission mechanism comprises a lead screw disposed on the connecting segment and a nut coupled with the lead screw, wherein the movable segment is coupled with the nut, the lead screw and the nut are coupled by threads, the lead screw is rotatable to cause the nut to move, and movement of the nut causes the movable segment to move relative to the connecting segment; or
the transmission mechanism comprises a gear disposed on the connecting segment and a teeth strap coupled with the movable segment and meshed with the gear, wherein the gear is rotatable to cause the teeth strap to move, and movement of the teeth strap causes the movable segment to move relative to the connecting segment; or
the transmission mechanism comprises a cam and a follower movably coupled with the cam, wherein the cam is rotatable to cause the follower to move, and movement of the follower causes the movable segment to move relative to the connecting segment; or
the transmission mechanism comprises a fixing part disposed on the connecting segment and a movable part coupled with the movable segment, wherein movement of the movable part causes the movable segment to move synchronously relative to the connecting segment; or
the transmission mechanism comprises a linear motor configured to drive the movable segment to move relative to the connecting segment.

6. The gimbal of claim 1, wherein the connecting segment and the movable segment are pivotably coupled, the movable segment is pivotable relative to the connecting segment, the at least one of the first frame or the second frame is extendable or retractable when an angle between the movable segment and the connecting segment is adjusted, which causes an adjustment to a position of the load relative to the gimbal, and an adjustment to a center of gravity of the gimbal and the load.

7. The gimbal of claim 6, wherein the at least one of the first frame or the second frame further comprises a mounting segment rotatably coupled with the movable segment, the at least one of the first frame or the second frame is extendable or retractable when an angle between the movable segment, the connecting segment, and the mounting segment is adjusted, which causes an adjustment to a position of the load relative to the gimbal.

8. The gimbal of claim 1, wherein each of the first frame and the second frame comprises the connecting segment and the movable segment movably coupled with the connecting segment.

9. The gimbal of claim 1, further comprising a holder coupled with the first frame to hold the load.

10. The gimbal of claim 1, further comprising:
a third frame rotatably coupled with an end of the second frame that is distant from the first frame.

11. The gimbal of claim 10, wherein:
the connecting segment is a first connecting segment, and the movable segment is a first movable segment; and
the third frame comprises a second connecting segment and a second movable segment movably coupled with the second connecting segment.

12. The gimbal of claim 1, wherein:
the movable segment includes a threaded hole connected with the receiving chamber.

13. An imaging device, comprising:
an image capturing sensor configured to capture one or more images; and
a gimbal for carrying the image capturing sensor, the gimbal comprising:
a first frame configured to be coupled with the image capturing sensor; and
a second frame rotatably coupled with the first frame,
wherein:
at least one of the first frame or the second frame comprises a connecting segment and a movable segment movably coupled with the connecting segment, the movable segment being movable relative to the connecting segment to cause the at least one of the first frame or the second frame to extend or retract, and
the connecting segment and the movable segment are sleeve coupled, and the movable segment includes a receiving chamber, and an end of the connecting segment sleeve coupled with the receiving chamber includes a scale to allow a user to record a value of the scale when the gimbal does not experience unexpected torques, the value of the scale indicating a position of the movable segment relative to the connecting segment corresponding to a weight of the load.

14. The imaging device of claim 13, wherein:
the movable segment is movable relative to the connecting segment to cause the at least one of the first frame or the second frame to extend or retract, the extension or retraction causes an adjustment of a position of the image capturing sensor relative to the gimbal, which in turn causes an adjustment of a center of gravity of the gimbal and the image capturing sensor.

15. The imaging device of claim 13, further comprising:
a transmission mechanism configured to couple the movable segment and the connecting segment, wherein the movable segment is movable relative to the connecting segment through the transmission mechanism.

16. An unmanned aerial vehicle, comprising:
a body; and
an imaging device mounted to the body, the imaging device comprising:
    an image capturing sensor configured to capture one or more images; and
    a gimbal for carrying the image capturing sensor, the gimbal comprising:
        a first frame configured to be coupled with the image capturing sensor; and
        a second frame rotatably coupled with the first frame,
    wherein:
        at least one of the first frame or the second frame comprises a connecting segment and a movable segment movably coupled with the connecting segment, the movable segment being movable relative to the connecting segment to cause the at least one of the first frame or the second frame to extend or retract, and
        the connecting segment and the movable segment are sleeve coupled, and the movable segment includes a receiving chamber, and an end of the connecting segment sleeve coupled with the receiving chamber includes a scale to allow a user to record a value of the scale when the gimbal does not experience unexpected torques, the value of the scale indicating a position of the movable segment relative to the connecting segment corresponding to a weight of the load.

17. The unmanned aerial vehicle of claim 16, wherein:
the movable segment is movable relative to the connecting segment to cause the at least one of the first frame or the second frame to extend or retract, the extension or retraction causes an adjustment of a position of the load relative to the gimbal, which in turn causes an adjustment of a center of gravity of the gimbal and the load.

18. The unmanned aerial vehicle of claim 16, further comprising:
a transmission mechanism configured to couple the movable segment and the connecting segment, wherein the movable segment is movable relative to the connecting segment through the transmission mechanism.

19. A gimbal for carrying a load, comprising:
a first frame configured to be coupled with the load; and
a second frame rotatably coupled with the first frame,
wherein:
    the first frame comprises a first connecting segment and a first movable segment movably coupled with the first connecting segment, the first movable segment being movable relative to the first connecting segment to cause the first frame to extend or retract along a first axis of the gimbal to change a shape of the first frame;
    the second frame comprises a second connecting segment and a second movable segment movably coupled with the second connecting segment, the second movable segment being movable relative to the second connecting segment to cause the second frame to extend or retract along a second axis of the gimbal to change a shape of the second frame; and
    the connecting segment and the movable segment are sleeve coupled, and the movable segment includes a receiving chamber, and an end of the connecting segment sleeve coupled with the receiving chamber includes a scale to allow a user to record a value of the scale when the gimbal does not experience unexpected torques, the value of the scale indicating a position of the movable segment relative to the connecting segment corresponding to a weight of the load.

20. The gimbal of claim 19, wherein the second axis is perpendicular to the first axis.

\* \* \* \* \*